United States Patent
Garrett et al.

(10) Patent No.: US 9,160,434 B2
(45) Date of Patent: Oct. 13, 2015

(54) RF TRANSCEIVER WITH BEAMFORMING ANTENNA AND METHODS FOR USE THEREWITH

(75) Inventors: David Garrett, Tustin, CA (US); Jun Zheng, San Diego, CA (US); Hamid Eslami, Newport Beach, CA (US)

(73) Assignee: Broadcom Corporation, Irvine, CA (US)

(*) Notice: Subject to any disclaimer, the term of this patent is extended or adjusted under 35 U.S.C. 154(b) by 0 days.

(21) Appl. No.: 13/329,302

(22) Filed: Dec. 18, 2011

(65) Prior Publication Data

US 2013/0109448 A1    May 2, 2013

Related U.S. Application Data

(60) Provisional application No. 61/552,835, filed on Oct. 28, 2011.

(51) Int. Cl.
*H04W 16/18* (2009.01)
*H04B 7/06* (2006.01)

(52) U.S. Cl.
CPC ............ *H04B 7/0617* (2013.01); *H04B 7/0623* (2013.01); *H04B 7/0695* (2013.01)

(58) Field of Classification Search
USPC .......... 455/575.7, 73; 375/267; 370/342, 328, 370/329, 338; 342/368
See application file for complete search history.

(56) References Cited

U.S. PATENT DOCUMENTS

| | | | |
|---|---|---|---|
| 7,206,610 B2* | 4/2007 | Iacono et al. | 455/562.1 |
| 8,229,017 B1* | 7/2012 | Lee et al. | 375/267 |
| 2004/0242273 A1* | 12/2004 | Corbett et al. | 455/562.1 |
| 2005/0255892 A1* | 11/2005 | Wong et al. | 455/562.1 |
| 2005/0285803 A1* | 12/2005 | Iacono et al. | 343/702 |
| 2006/0057964 A1* | 3/2006 | Roy et al. | 455/67.11 |
| 2006/0189355 A1 | 8/2006 | Cuffaro | |
| 2008/0304464 A1* | 12/2008 | Borkar et al. | 370/342 |
| 2009/0051592 A1* | 2/2009 | Lee et al. | 342/368 |
| 2009/0232063 A1* | 9/2009 | Cordeiro et al. | 370/329 |
| 2010/0151865 A1* | 6/2010 | Camp et al. | 455/445 |
| 2011/0013611 A1* | 1/2011 | Chou et al. | 370/338 |
| 2011/0205969 A1* | 8/2011 | Ahmad et al. | 370/328 |

* cited by examiner

*Primary Examiner* — Junpeng Chen
(74) *Attorney, Agent, or Firm* — Garlick & Markison; Bruce E. Stuckman

(57) ABSTRACT

An RF transceiver includes a configuration controller that generates a control signal to select a first candidate radiation pattern for a beamforming antenna based on a first plurality of steering weights. An RF transceiver section broadcasts a first beacon transmission with the first candidate radiation pattern, and generates feedback signals to indicate if a first remote station has responded to the first beacon transmission. When the first remote station has responded to the first beacon transmission, the configuration controller stores the first plurality of steering weights used in association with the beacon transmission and generates control signals to the RF transceiver section to use the first candidate radiation pattern when communicating with the first remote station.

19 Claims, 8 Drawing Sheets

RF TRANSCEIVER WITH BEAMFORMING ANTENNA AND METHODS FOR USE THEREWITH

CROSS REFERENCE TO RELATED PATENTS

The present application claims priority based on 35 U.S.C. §119 to the provisionally filed application entitled, LOCAL AREA NETWORK TRANSCEIVER AND METHODS FOR USE THEREWITH, having Ser. No. 61/552,835, filed on Oct. 28, 2011, expired, the contents of which are incorporated herein for any and all purposes, by reference thereto.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates generally to wireless communication and more particularly to antennas used to support wireless communications.

2. Description of Related Art

Communication systems are known to support wireless and wireline communications between wireless and/or wireline communication devices. Such communication systems range from national and/or international cellular telephone systems to the Internet to point-to-point in-home wireless networks to radio frequency identification (RFID) systems. Each type of communication system is constructed, and hence operates, in accordance with one or more communication standards. For instance, wireless communication systems may operate in accordance with one or more standards including, but not limited to, RFID, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., a receiver and transmitter or multiple receivers and transmitters) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier(s). The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Currently, wireless communications occur within licensed or unlicensed frequency spectrums. For example, wireless local area network (WLAN) communications occur within the unlicensed Industrial, Scientific, and Medical (ISM) frequency spectrum of 900 MHz, 2.4 GHz, and 5 GHz. While the ISM frequency spectrum is unlicensed there are restrictions on power, modulation techniques, and antenna gain. Another unlicensed frequency spectrum is the V-band of 55-64 GHz.

Other disadvantages of conventional approaches will be evident to one skilled in the art when presented the disclosure that follows.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

DETAILED DESCRIPTION OF THE INVENTION

Figure 1:
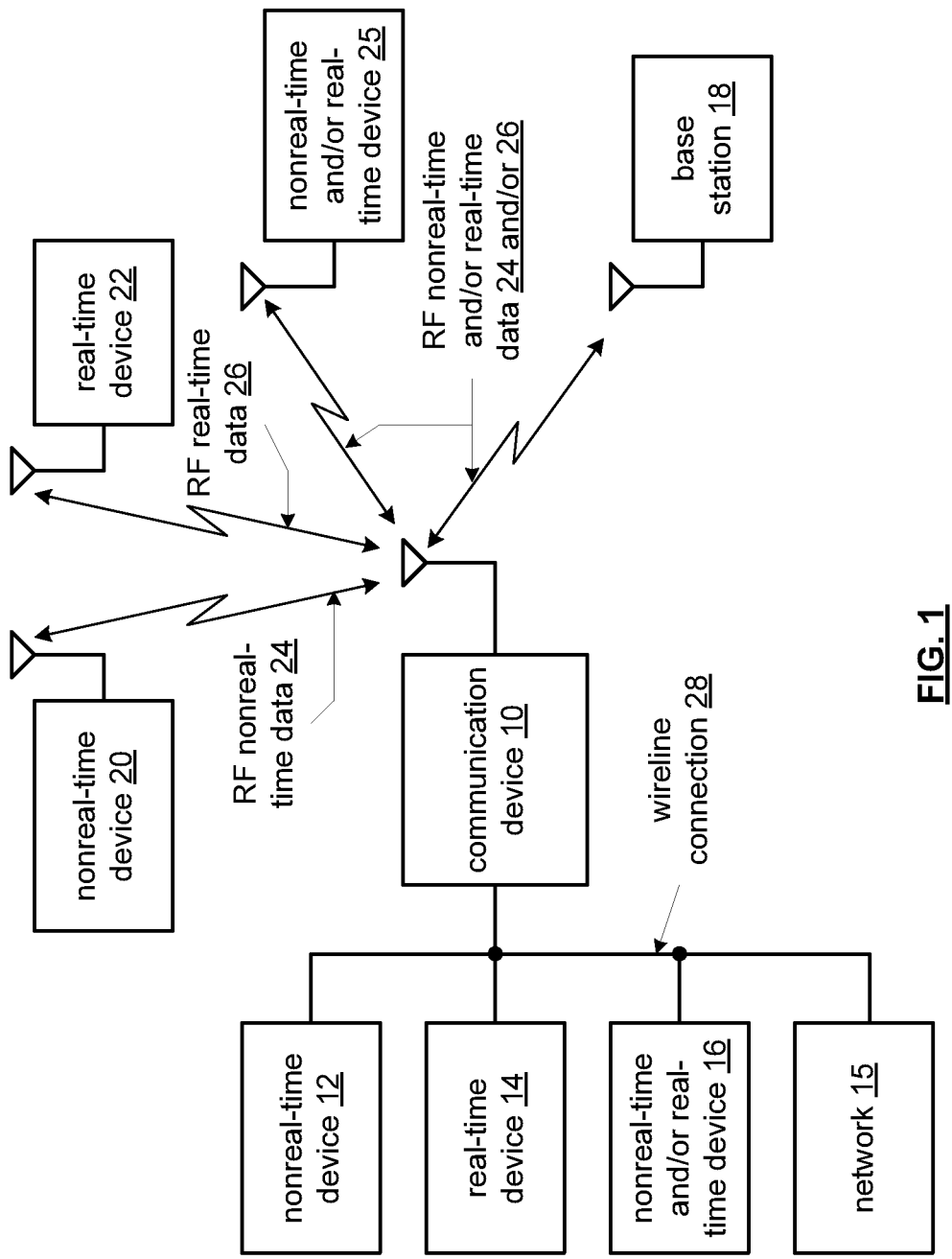
FIG. 1 is a schematic block diagram of an embodiment of a wireless communication system in accordance with the present invention.

FIG. 1 is a schematic block diagram of an embodiment of a communication system in accordance with the present invention. In particular a communication system is shown that includes a communication device 10 that communicates real-time data 24 and/or non-real-time data 26 wirelessly with one or more other devices such as base station 18, non-real-time device 20, real-time device 22, and non-real-time and/or real-time device 25. In addition, communication device 10 can also optionally communicate over a wireline connection with network 15, non-real-time device 12, real-time device 14, non-real-time and/or real-time device 16.

In an embodiment of the present invention the wireline connection 28 can be a wired connection that operates in accordance with one or more standard protocols, such as a universal serial bus (USB), Institute of Electrical and Electronics Engineers (IEEE) 488, IEEE 1394 (Firewire), Ethernet, small computer system interface (SCSI), serial or parallel advanced technology attachment (SATA or PATA), or other wired communication protocol, either standard or proprietary. The wireless connection can communicate in accordance with a wireless network protocol such as WiHD, NGMS, IEEE 802.11a, ac, b, g, n, or other 802.11 standard protocol, Bluetooth, Ultra-Wideband (UWB), WIMAX, or other wireless network protocol, a wireless telephony data/voice protocol such as Global System for Mobile Communications (GSM), General Packet Radio Service (GPRS), Enhanced Data Rates for Global Evolution (EDGE), Long term Evolution (LTE), Personal Communication Services (PCS), or other mobile wireless protocol or other wireless communication protocol, either standard or proprietary. Further, the wireless communication path can include multiple transmit and receive antennas, as well as separate transmit and receive paths that use separate carrier frequencies and/or separate frequency channels. Alternatively, a single frequency or frequency channel can be used to bi-directionally communicate data to and from the communication device 10.

Communication device 10 can be a mobile phone such as a cellular telephone, a local area network device, personal area network device or other wireless network device, a personal digital assistant, game console, personal computer, laptop computer, or other device that performs one or more functions that include communication of voice and/or data via wireline connection 28 and/or the wireless communication path. Further communication device 10 can be an access point, base station or other network access device that is coupled to a network 15 such at the Internet or other wide area network, either public or private, via wireline connection 28. In an embodiment of the present invention, the real-time and non-real-time devices 12, 14 16, 20, 22 and 25 can be personal computers, laptops, PDAs, mobile phones, such as cellular telephones, devices equipped with wireless local area network or Bluetooth transceivers, FM tuners, TV tuners, digital cameras, digital camcorders, or other devices that either produce, process or use audio, video signals or other data or communications.

In operation, the communication device includes one or more applications that include voice communications such as standard telephony applications, voice-over-Internet Protocol (VoIP) applications, local gaming, Internet gaming, email, instant messaging, multimedia messaging, web browsing, audio/video recording, audio/video playback, audio/video downloading, playing of streaming audio/video, office applications such as databases, spreadsheets, word processing, presentation creation and processing and other voice and data applications. In conjunction with these applications, the real-time data 26 includes voice, audio, video and multimedia applications including Internet gaming, etc. The non-real-time data 24 includes text messaging, email, web browsing, file uploading and downloading, etc.

In an embodiment of the present invention, the communication device 10 includes a wireless transceiver that includes one or more features or functions of the present invention. Such wireless transceivers shall be described in greater detail in association with FIGS. 3-8 that follow.

Figure 2:
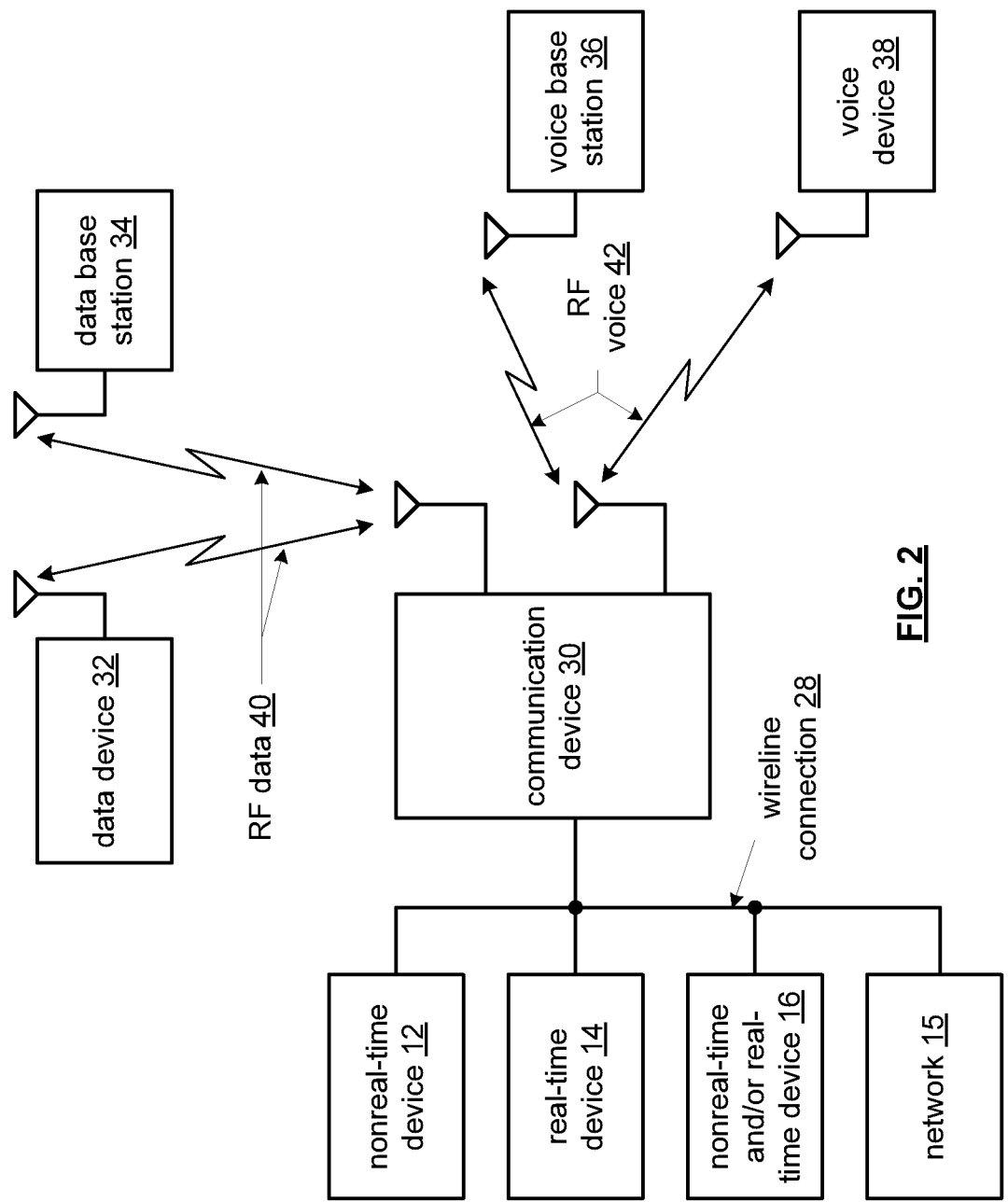
FIG. 2 is a schematic block diagram of another embodiment of a wireless communication system in accordance with the present invention.

FIG. 2 is a schematic block diagram of an embodiment of another communication system in accordance with the present invention. In particular, FIG. 2 presents a communication system that includes many common elements of FIG. 1 that are referred to by common reference numerals. Communication device 30 is similar to communication device 10 and is capable of any of the applications, functions and features attributed to communication device 10, as discussed in conjunction with FIG. 1. However, communication device 30 includes two or more separate wireless transceivers for communicating, contemporaneously, via two or more wireless communication protocols with data device 32 and/or data base station 34 via RF data 40 and voice base station 36 and/or voice device 38 via RF voice signals 42.

Figure 3:
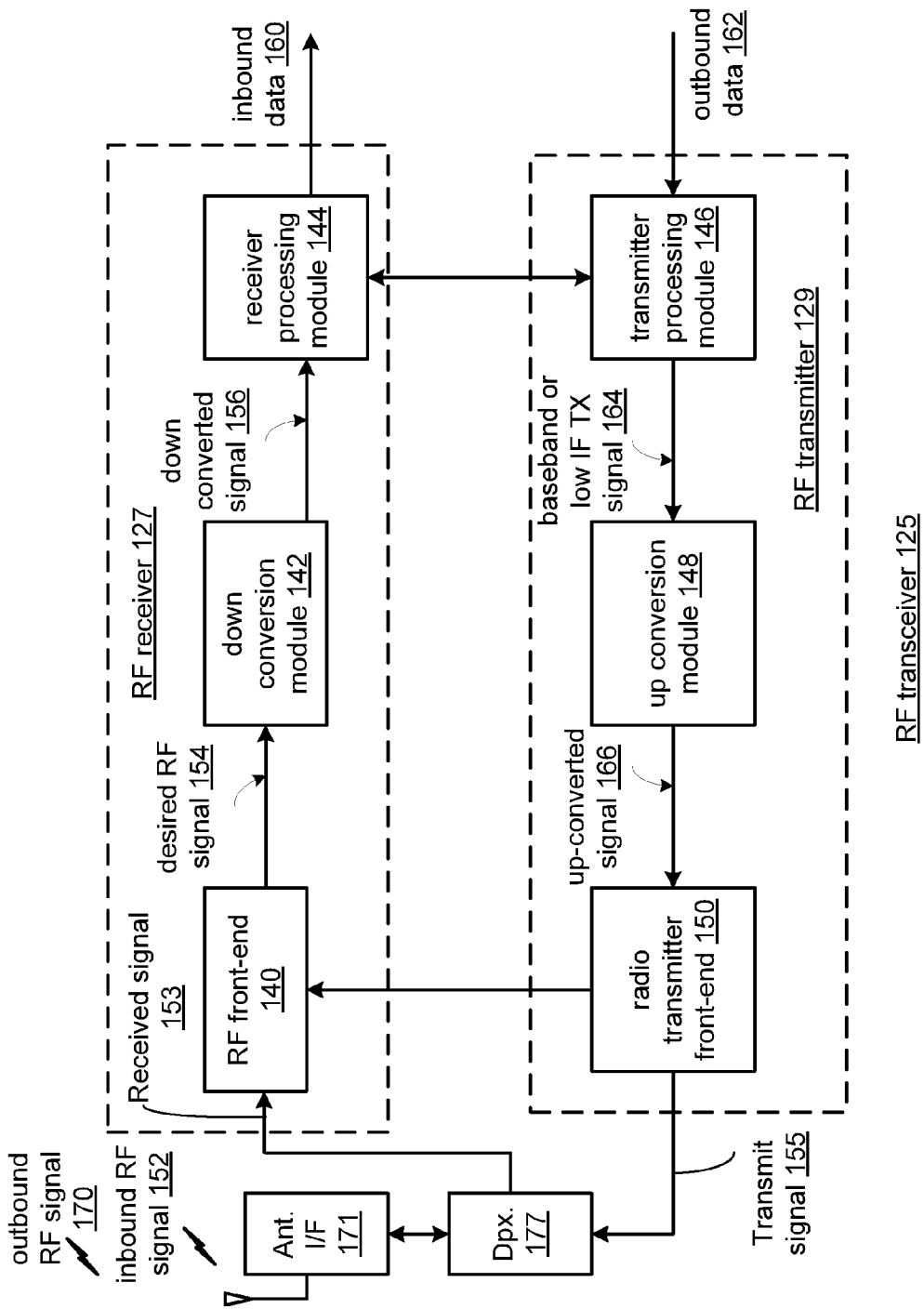
FIG. 3 is a schematic block diagram of an embodiment of a wireless transceiver 125 in accordance with the present invention.

FIG. 3 is a schematic block diagram of an embodiment of a wireless transceiver 125 in accordance with the present invention. The RF transceiver 125 represents a wireless transceiver for use in conjunction with communication devices 10 or 30, base station 18, non-real-time device 20, real-time device 22, and non-real-time, real-time device 25, data device 32 and/or data base station 34, and voice base station 36 and/or voice device 38. RF transceiver 125 includes an RF transmitter 129, and an RF receiver 127. The RF receiver 127 includes a RF front end 140, a down conversion module 142 and a receiver processing module 144. The RF transmitter 129 includes a transmitter processing module 146, an up conversion module 148, and a radio transmitter front-end 150.

As shown, the receiver and transmitter are each coupled to an antenna through an antenna interface 171 and a diplexer (duplexer) 177, that couples the transmit signal 155 to the antenna to produce outbound RF signal 170 and couples inbound signal 152 to produce received signal 153. Alternatively, a transmit/receive switch can be used in place of diplexer 177. While a single antenna is represented, the receiver and transmitter may share a multiple antenna structure that includes two or more antennas. In another embodiment, the receiver and transmitter may share a multiple input multiple output (MIMO) antenna structure, diversity antenna structure, phased array or other controllable antenna structure that includes a plurality of antennas and other RF transceivers similar to RF transceiver 125. Each of these antennas may be fixed, programmable, and antenna array or other antenna configuration. Also, the antenna structure of the wireless transceiver may depend on the particular standard(s) to which the wireless transceiver is compliant and the applications thereof.

In operation, the RF transmitter 129 receives outbound data 162. The transmitter processing module 146 packetizes outbound data 162 in accordance with a millimeter wave protocol or wireless telephony protocol, either standard or proprietary, to produce baseband or low intermediate frequency (IF) transmit (TX) signals 164 that includes an outbound symbol stream that contains outbound data 162. The baseband or low IF TX signals 164 may be digital baseband signals (e.g., have a zero IF) or digital low IF signals, where the low IF typically will be in a frequency range of one hundred kilohertz to a few megahertz. Note that the processing performed by the transmitter processing module 146 can include, but is not limited to, scrambling, encoding, puncturing, mapping, modulation, and/or digital baseband to IF conversion.

The up conversion module 148 includes a digital-to-analog conversion (DAC) module, a filtering and/or gain module, and a mixing section. The DAC module converts the baseband or low IF TX signals 164 from the digital domain to the analog domain. The filtering and/or gain module filters and/or adjusts the gain of the analog signals prior to providing it to the mixing section. The mixing section converts the analog baseband or low IF signals into up-converted signals 166 based on a transmitter local oscillation.

The radio transmitter front end 150 includes a power amplifier and may also include a transmit filter module. The power amplifier amplifies the up-converted signals 166 to produce outbound RF signals 170, which may be filtered by the transmitter filter module, if included. The antenna structure transmits the outbound RF signals 170 via an antenna interface 171 coupled to an antenna that provides impedance matching and optional bandpass filtration.

The RF receiver 127 receives inbound RF signals 152 via the antenna and antenna interface 171 that operates to process the inbound RF signal 152 into received signal 153 for the receiver front-end 140. In general, antenna interface 171 provides impedance matching of antenna to the RF front-end 140, optional bandpass filtration of the inbound RF signal 152.

The down conversion module 142 includes a mixing section, an analog to digital conversion (ADC) module, and may also include a filtering and/or gain module. The mixing section converts the desired RF signal 154 into a down converted signal 156 that is based on a receiver local oscillation, such as an analog baseband or low IF signal. The ADC module converts the analog baseband or low IF signal into a digital baseband or low IF signal. The filtering and/or gain module high pass and/or low pass filters the digital baseband or low IF signal to produce a baseband or low IF signal 156 that includes a inbound symbol stream. Note that the ordering of the ADC module and filtering and/or gain module may be switched, such that the filtering and/or gain module is an analog module.

The receiver processing module 144 processes the baseband or low IF signal 156 in accordance with a millimeter wave protocol, either standard or proprietary to produce inbound data 160 such as probe data received from a probe device or devices. The processing performed by the receiver processing module 144 can include, but is not limited to, digital intermediate frequency to baseband conversion, demodulation, demapping, depuncturing, decoding, and/or descrambling.

In an embodiment of the present invention, receiver processing module 144 and transmitter processing module 146 can be implemented via use of a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The associated memory may be a single memory device or a plurality of memory devices that are either on-chip or off-chip. Such a memory device may be a read-only memory, random access memory, volatile memory, non-volatile memory, static memory, dynamic memory, flash memory, and/or any device that stores digital information. Note that when the processing devices implement one or more of their functions via a state machine, analog circuitry, digital circuitry, and/or logic circuitry, the associated memory storing the corresponding operational instructions for this circuitry is embedded with the circuitry comprising the state machine, analog circuitry, digital circuitry, and/or logic circuitry. As shown there is a feedback path between the receiver processing module 144 and transmitter processing module 146 for the purposes of beamforming calibration as will be described in greater detail in conjunction with FIGS. 4-8 that follow.

While the processing module 144 and transmitter processing module 146 are shown separately, it should be understood that these elements could be implemented separately, together through the operation of one or more shared processing devices used for baseband processing of multiple RF sections or in any other combination of separate and shared processing.

Further details including optional functions and features of the RF transceiver are discussed in conjunction with FIGS. 4-8 that follow.

Figure 4:
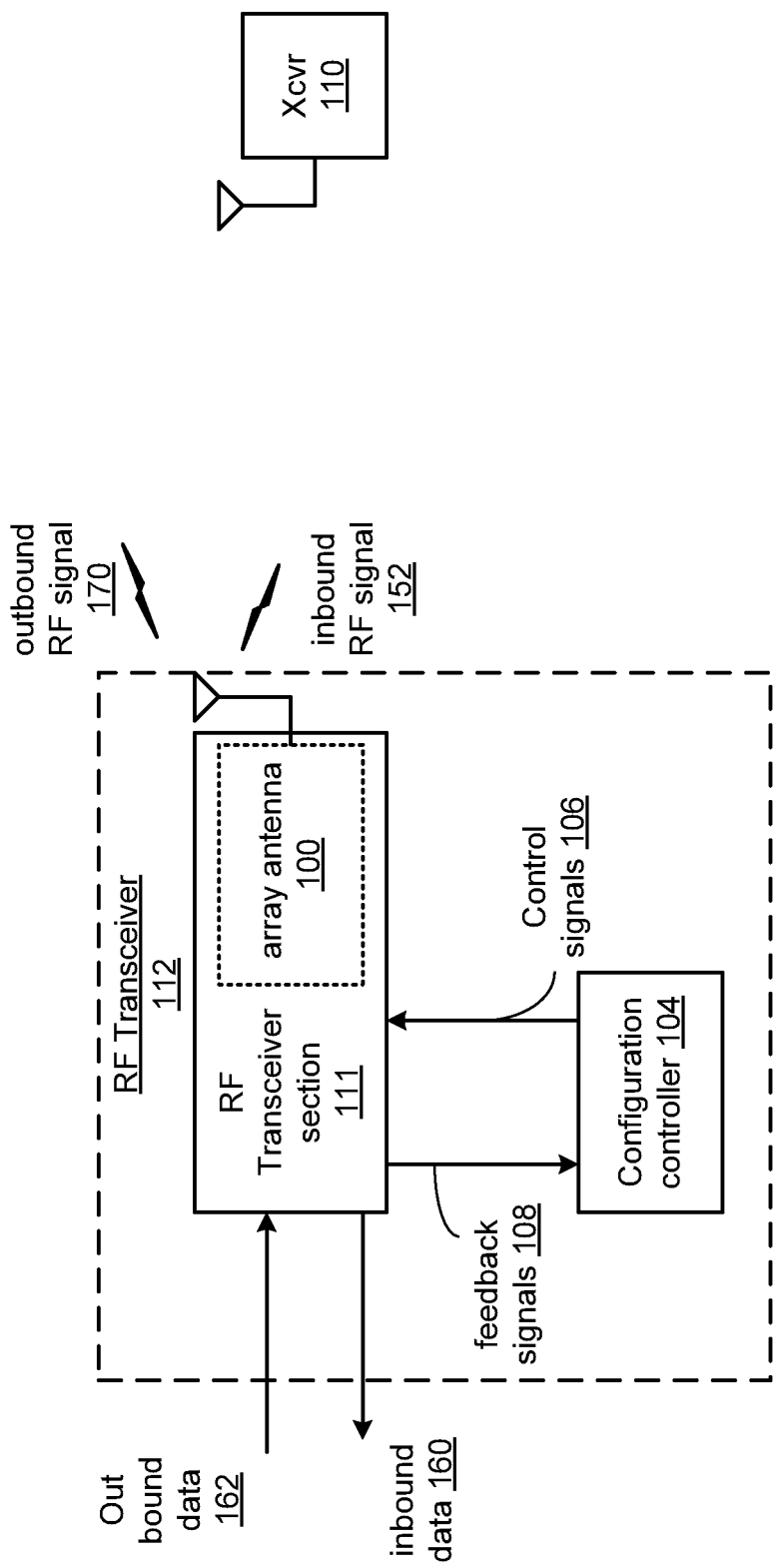
FIG. 4 is a schematic block diagram of an embodiment of a RF transceiver 112 in accordance with the present invention.

FIG. 4 is a schematic block diagram of an embodiment of a RF transceiver 112 in accordance with the present invention. In particular, a wireless transceiver 112 is shown that can be used in place of RF transceiver 125. Wireless transceiver 112 includes an RF transceiver section 111 that includes one or more RF transmitters such as RF transmitter 129 and one or more RF receivers, such as RF receiver 127 as well as an array antenna 100. RF transceiver 112 transmits an outbound RF signal 170 via array antenna 100 containing outbound data 162 to one or more remote transceivers such as a wireless transceiver 110. In addition, array antenna 100 receives an inbound RF signal 152 containing inbound data 160 from the wireless transceiver 110. The array antenna 100 is configurable based on control signals 106 from configuration controller 104 to a plurality of different radiation patterns.

The array antenna 100 includes multiple individual antenna elements. Examples of such individual antenna elements include monopole or dipole antennas, three-dimensional in-air helix antenna, aperture antennas of a rectangular shape, horn shaped, etc.; dipole antennas having a conical shape, a cylinder shape, an elliptical shape, etc.; and reflector antennas having a plane reflector, a corner reflector, or a parabolic reflector; meandering pattern or a micro strip configuration. In addition, RF transceiver section 111 includes a control matrix that controls the phase and amplitude of the signals to and from each individual antenna element in order to adjust the transmit and/or receive radiation pattern of the array based on steering weights $w_i$. The steering weights, $w_i$, control the gains and phases of the transmitted signals before reaching the antenna array 100. Each set of steering weights may include frequency dependent gains and phases in order to shape the beamformed transmission over the signal bandwidth. An example would a unique gain and phase for each OFDM frequency bin in the case of 802.11n/802.11ac transmissions. The steering weights can be selected to represent a particular radiation pattern, or can be generated from a mathematical set of equations that does not represent a physical radiation pattern. The antenna array 100 can be tuned for operation in the V-band of 55-64 GHz or other millimeter wave frequency band or other portion of the RF spectrum such as a 900 MHz band, 2.4 GHz band or 5 GHz band.

Configuration controller 104 can be implemented using a shared processing device, individual processing devices, or a plurality of processing devices and may further include memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the configuration controller 104 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In an embodiment of the present invention, the configuration controller 104 contains a table of control signals 106 that correspond to a plurality of steering weights. In operation, a particular set of steering weights are generated for the array antenna 100 by the configuration controller 104 generating the corresponding control signals 106 and the RF transceiver section adjusting gains and phases of signals to and from each antenna in the array in response thereto. In an embodiment of the present invention, the control signals 106 include a particular value of the steering weights $w_i$ corresponding to the desired radiation pattern. Alternatively, the control signals 106 can include any other signal that indicates the desired radiation pattern. Configuration controller 104 can radiation patterns based on feedback signals 108 from RF transceiver section 111. In the system, the RF transceiver 112 is defined as the beamformer, and the RF transceiver 110 is defined as the beamformee, since it is receiving the transmit beamforming frame.

In an embodiment of the present invention, the RF transceiver 112 implements transparent TX beamforming, in effect TX beamforming without any involvement from the beamformee—in this case transceiver 110. In operation, the RF transceiver 112 obtains channel state information (CSI) from reverse link channel estimation (i.e. ACK frames and/or received frames) and applies self-reciprocity calibration to the measured reverse link channel generated by configuration controller 104. This allows RF transceiver 112 to beamform to TXBF-incapable devices such as legacy 802.11a/g devices, or to 802.11n/11ac devices that do not support TX beamforming. It improves the quality of the CSI information since it can be applied directly after the receipt of the previous frame of information. Without the immediate turn-around, the CSI becomes less relevant because of the latency of when it was measured, and when it is applied on the beamformer transmission. It also generates improved CSI quality by reducing latency (benefitting both SU-MIMO and MU-MIMO configurations) and enables transparent DL-MU-MIMO TX beamforming without STA's realization. The configuration also saves feedback overhead when communicating to an Explicit-TXBF-capable device, and does not involved over-the-air communication of steering weights.

In operation, the RF transceiver 112 takes advantage of channel reciprocity in order to improve channel state information (CSI) quality at the transmitter. In particular, the RF transceiver 112 performs implicit beamforming, by obtaining CSI through reverse-link channel estimation. Considering RF transceiver 112 to be Station "A" and transceiver 110 to be Station "B", configuration controller 104 operates based on feedback signals 108 to obtain channel state information at the "A" side through reverse link channel estimation H_BA. Based on channel reciprocity, the forward link channel response can be obtained by: $H\_AB=(H\_BA)^T$. There is a difference in the forward and reverse link paths based on the transfer functions of the beamformer and beamformee radio transceivers. The forward path includes the transfer function of station A transmit, G_TA, the channel, H, and the station B receive transfer function, G_RB. The reverse path includes the transfer function of station B transmit, G_TB, the reverse channel, $H^T$, and the station A receive transfer function, G_RA. The goal is to measure the baseband-to-baseband reverse link path, $H\_BA=(G\_TB)(H^T)(G\_RA)$, and then estimate the forward link channel, $H\_AB=(G\_TA)(H)(G\_RB)$. Solving for the measure reverse path link, the forward link estimate is compute with $H\_AB=(G\_TA/G\_RA)(H\_BA^T)(G\_RB/G\_TB)$. The beamformer can compensate for its own transmit receive mismatch (G_TA/G_RA), and can also compensate for the beamformee side mismatch if known. In general, the estimate of the forward link is less sensitive to the beamformee mismatch, (G_TA/G_RA), and in practice can be ignored, i.e. $H\_AB=(G\_TA/G\_RA)(H\_BA^T)$.

RF transceiver 111 generates a transmit precoding matrix to generate the desired steering weights w, based on H_AB. Beamformed (steered) packets from station A can be formed without the notice or involvement of beamformee (station B). However, link budget between station A and B are improved in terms of both range and rate.

As discussed above, the use of this transparent beamforming methodology enables MIMO TX beamforming to Legacy devices (802.11a/g) or TXBF-incapable devices and avoids the use of an over-the-air two-station channel calibration process. In practice, only the beamformer-side on-chip self-calibration is required for good performance. This further serves to reduce channel mismatch due to Doppler and/or feedback latency, reduce the feedback overhead. In addition, it benefits MU-MIMO TXBF algorithm because of its increased sensitivity to CSI quality compared to SU-MIMO.

Figure 5:
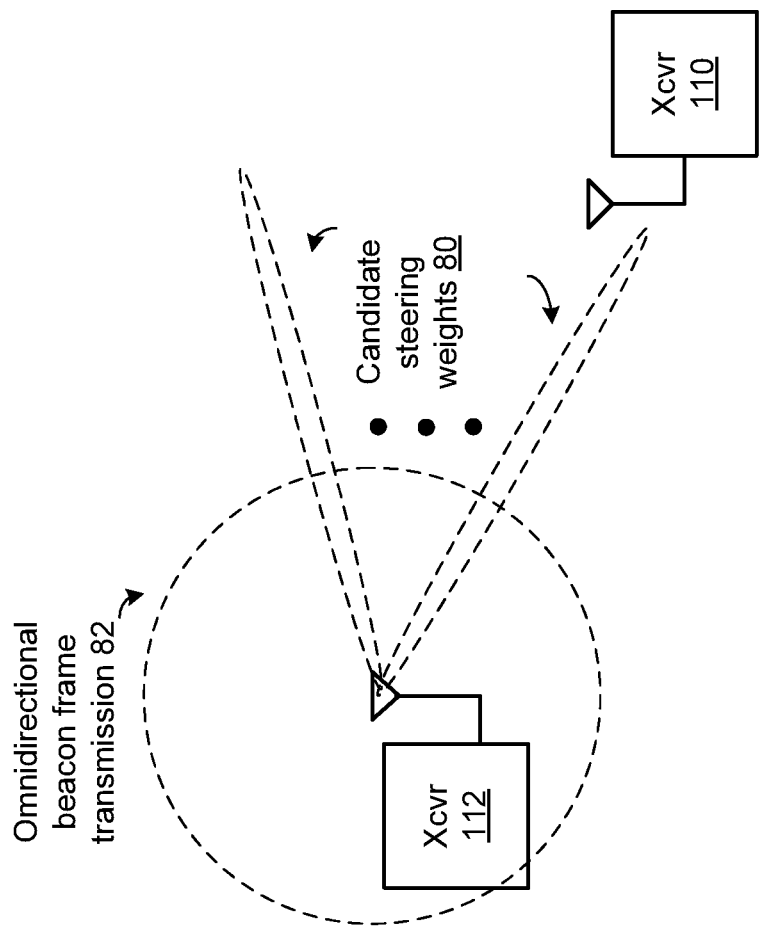
FIG. 5 is a schematic block diagram of various radiation patterns produced by wireless transceiver 112 in accordance an embodiment of the present invention.

FIG. 5 is a schematic block diagram of various radiation patterns produced by wireless transceiver 112 in accordance an embodiment of the present invention. In particular, in addition to, or in an alternative to the transparent beamforming described in conjunction with FIG. 4, RF transceiver 112 is capable of beamforming beacon transmissions to locate and associate with remote transceivers, such as transceiver 110 that may be out of range of omnidirectionally transmitted beacon signals.

In the 802.11 protocol, a beacon frame is periodically transmitted by an access point (AP) in order to broadcast all of the information about the network. It includes key pieces of information including the timestamp, and beacon interval, capability information, and the service set identifier (SSID) among others. This is the key frame that gives a station (STA) the ability to know about the network, and start the process of connecting the AP and establishing a data connection.

One of the key problems with the transmit beamforming (TxBF) protocol in the 802.11 standard is that it only proceeds once an initial connection is made. Once the connection between AP and STA has been established, TxBF can improve the effective signal-to-noise ratio (SNR), thereby improving the system capacity. Unfortunately, it does not improve the effective range of the AP since reception of the beacon is a limiting factor. This means that a STA outside the initial range of the AP (without beamforming) cannot connect to the network, even if it was reachable through TxBF.

RF transceiver 112 is implemented in an access point to improves its' effectively range by using TxBF on the beacon frames, thereby enabling STAs to receive the beacon and start the connection with the AP (typically through the authentication and then associate steps). The AP broadcasts the beacon with a known set of TxBF steering weights, and then periodically transmits the beacon with different sets of TxBF weights in order to cover the entire region of interest. This can be TxBF weights can be optimized spatially for the room, and can be optimized in the frequency domain (no particular antenna geometry implied with the steering weights). In addition, the AP can also include non-steered beacon frames as well so as to not impact the normal coverage range of the AP. The particular AP can decide between the number of TxBF beacons, and there frequency of transmission in to balance the ability for an out-of-range STA to enter the network, and also allow in-range STA to connect. The beam-formed beacon may not be received by all available STAs that are in close proximity to the AP because of the directional nature of the wireless signals.

In the example shown in FIG. 5, transceiver 110 is out of the nominal range of the standard omnidirectional beacon frame transmission 82. In the example, if they AP used the proper steering weights $w_i$, the wireless signal be strengthened in the direction of STA-2, and then successfully receive the beacon, and start the authentication and association frame exchange. In operation, the RF transceiver 112 generates a plurality of candidate radiation patterns 80 having corresponding steering weights $w_i$. For example, candidate radiation patterns can be sequentially scanned, generated randomly, etc.

Once a candidate the beacon has been sent with a candidate radiation pattern, the AP must then track all the new STAs that enter the network using this beacon. The tracking is very important because successive packets to be transmitted specifically to the STA should use the same TxBF weights in order to reach the STA. Once the full connection has been established, the AP can further refine the TxBF weights to the STA by measuring the reverse-link channel, as described in conjunction with FIG. 4. The AP can associate the STA with the TxBF beacon in a number of ways, first by the time-based element. Any STA that responds immediately after a beacon, the AP can use the TxBF weights to continue the communication with that STA. There are alternate methods where the AP could use an unique SSID for each of the TxBF steering beacons, and thereby identify the appropriate TxBF steering weights based on the SSID in the next packet from the STA.

In an embodiment of the present invention, the AP starts by sending a beacon with a set of weights, $w_i$. If the AP receives a response from a STA, it records the weights, $w_i$, with that particular STA and initiates the further packet exchanges using those weights. After the beacon interval has been reached, the AP updates the TxBF weights for the beacon to a new candidate radiation pattern 80, and resumes looking for STA response.

Figure 6:
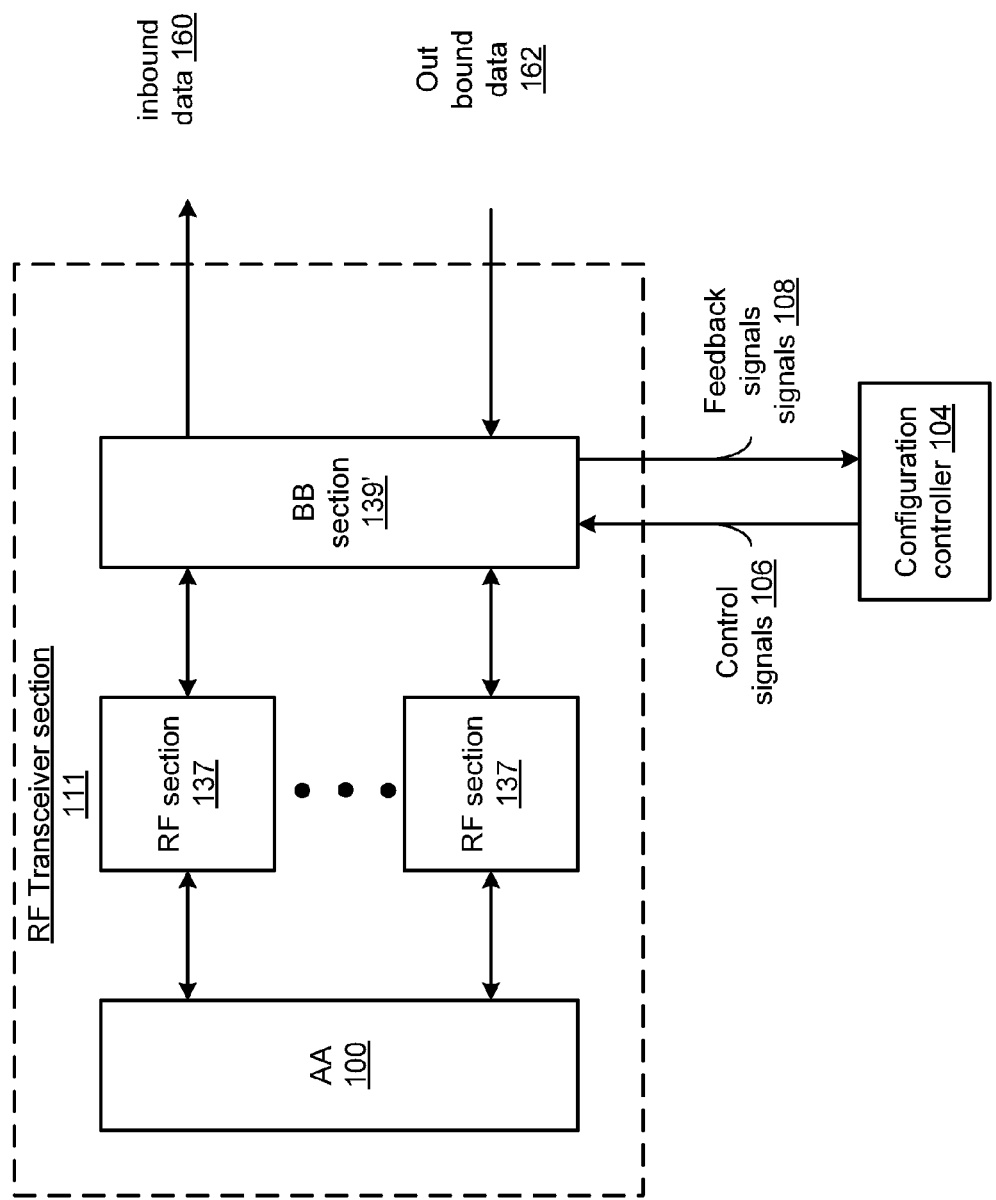
FIG. 6 is a schematic block diagram of an embodiment of a RF transceiver section 111 in accordance with the present invention.

FIG. 6 is a schematic block diagram of an embodiment of a RF transceiver section 111 in accordance with the present invention. In particular, RF transceiver section includes multiple RF sections 137 corresponding, for example, to each of the antennas in antenna array 100. Each RF section can include, for example, RF front-end 140, down conversion module 142, up conversion module 148 and radio transmitter front-end 150. The functionality of receiver processing module 144 and transmitter processing module 146, for each RF section 137, can be implemented by a baseband section 139.

As discussed in conjunction with FIG. 4, the configuration controller 104 can contains a table of control signals 106 that correspond to a plurality of different steering weights, $w_i$. In operation, a particular set of steering weights is generated for the array antenna 100 by the configuration controller 104 generating the corresponding control signals 106 and the RF transceiver section adjusting gains and phases of signals to and from each antenna in the array in response thereto. In an embodiment of the present invention, the feedback signals 108 can include reverse link channel estimation H_BA, a forward channel link estimate H_AB, CSI or other feedback used to generate the control signals 106. The control signals 106 can include a particular value of the steering weights $w_i$ corresponding to the desired radiation pattern generated based on feedback signal 108 or based on an updated candidate radiation pattern or based on other input.

Alternatively, the control signals 106 can include any other signal that indicates the desired radiation pattern. Configuration controller 104 can radiation patterns based on feedback signals 108 from RF transceiver section 111.

The operation of RF transceiver 111 can be described in conjunction with the following example. The configuration controller 104 generates a control signal 106 to select a first candidate radiation pattern for the beamforming antenna array 100 based on a first plurality of steering weights. The RF transceiver section 111 broadcasts a first beacon transmission with the first candidate radiation pattern, to generate feedback signals 108 to indicate if a remote station has responded to the first beacon transmission during some predetermined interval. When a remote station, such as transceiver 110, has responded to the first beacon transmission, the configuration controller 104 is further operable to store the first plurality of steering weights used in association with the first beacon transmission. The configuration controller 104 generates control signals 106 to the RF transceiver section 111 to use the first candidate radiation pattern when communicating with this remote station in packet transmission addressed to the remote station.

Whether or not a station has not responded to the first beacon transmission during the predetermined interval, the configuration controller 104 is further operable to generate the control signal 106 to select a second candidate radiation pattern for the beamforming antenna 100 based on a second plurality of steering weights. The RF transceiver section 111 is further operable to broadcast a second beacon transmission with the second candidate radiation pattern, and generates the feedback signals 108 to indicate if any remote station has responded to the second beacon transmission.

In this fashion, the configuration controller 104 generates the control signals 106 to select a plurality of candidate radiation patterns and the RF transceiver section 111 periodically broadcasts beacon transmissions via the plurality of candidate radiation patterns. The plurality of candidate radiation patterns can include an omnidirectional radiation pattern and a plurality of different narrow beam radiation patterns. In particular, the configuration controller 104 can generate control signals 106 to alternate between an omnidirectional radiation pattern and a selected one of a plurality of different narrow beam radiation patterns.

As discussed above, when a remote station has responded to a beacon transmission, the configuration controller 104 is further operable to determine a reverse channel estimation to that remote station based on the communication with the remote station using the corresponding candidate radiation pattern, and to adjust the steering weights and the radiation pattern based on the reverse channel estimation. It should be noted that, while the above description focuses on communication with a single remote station, associations with multiple remote stations can be accomplished in a similar fashion, with each remote station having either the same or different steering weights, depending on the responses of those stations to the beacon transmissions.

It should also be noted that while the candidate steering weights discussed above are shown to generate narrow beam radiation patterns, the control of amplitude, phase and frequency used in adjusting the candidate steering weights may or may not generate such narrowband or directed radiation patterns.

Figure 7:
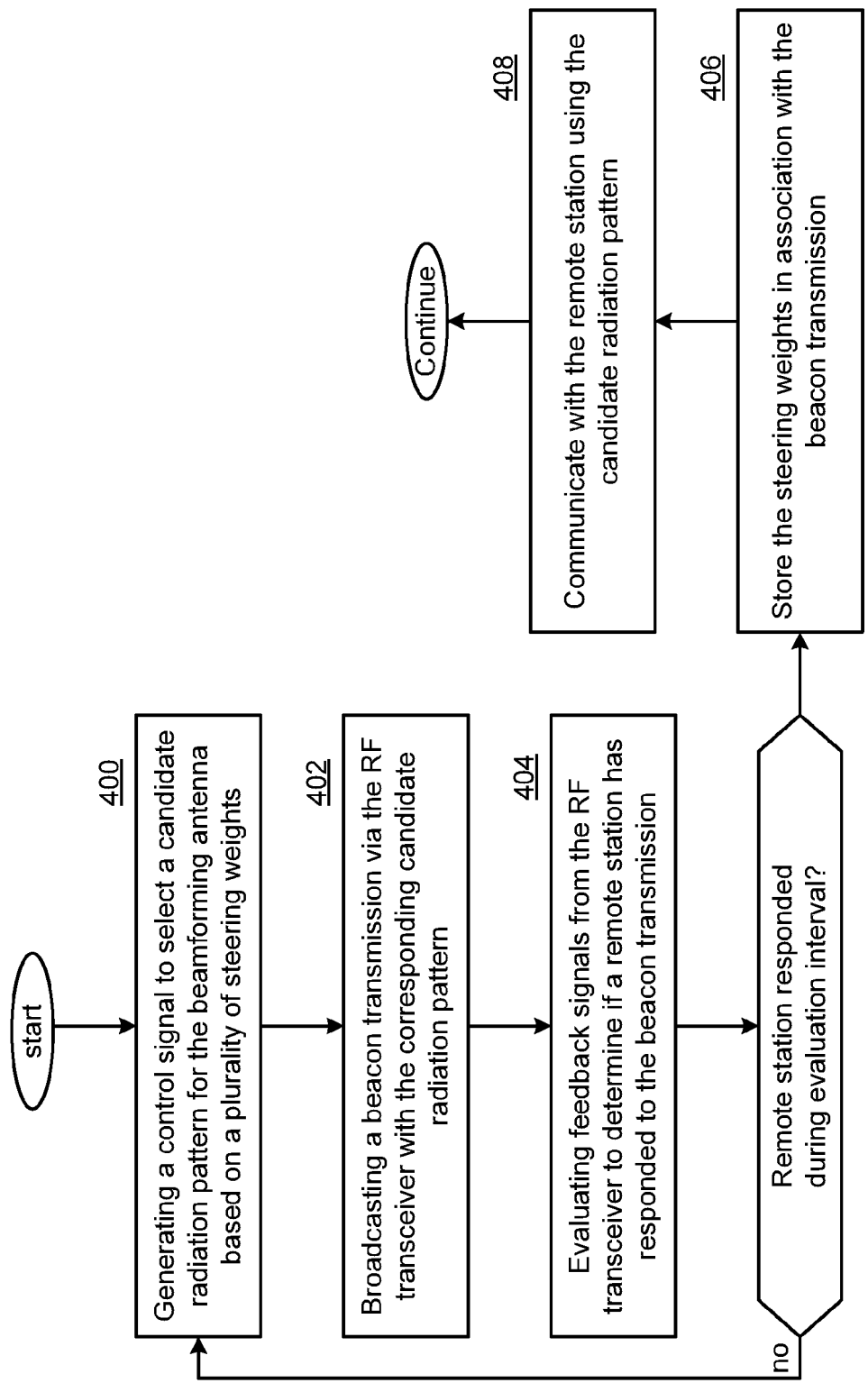
FIG. 7 is a flow diagram of an embodiment of a method in accordance with the present invention.

FIG. 7 is a flow diagram of an embodiment of a method in accordance with the present invention. In particular, a method is presented for use in conjunction with one or more functions and features described in conjunction with FIGS. 1-6. In step 400, a control signal is generated to select a candidate radiation pattern for the beamforming antenna based on a plurality of steering weights. In step 402, a beacon transmission is broadcast via the RF transceiver with the candidate radiation pattern. In step 404, the feedback signals from the RF transceiver are evaluated to determine if a one or more remote stations have responded to the first beacon transmission. If a remote station has not responded to the beacon transmission during a response interval, the method returns to step 400 to select a new candidate radiation pattern. If a remote station has responded during the evaluation interval, the method proceeds to step 406 to store the plurality of steering weights used in association with the beacon transmission and to step 408 to communicate with the first remote station using the first candidate radiation pattern. At the predetermined time, the RF transceiver returns to 400 and restarts a new beacon transmission.

In an embodiment of the present invention steps 400 and 402 are part of process to periodically broadcast beacon transmissions via a plurality of candidate radiation patterns. The plurality of candidate radiation patterns may include an omnidirectional radiation pattern and a plurality of different narrow beam radiation patterns. In particular, the plurality of candidate radiation patterns can alternate between an omnidirectional radiation pattern and a selected one of a plurality of different narrow beam radiation patterns. As discussed above however, the control of amplitude, phase and frequency used in adjusting the candidate steering weights may or may not generate such narrowband or directed radiation patterns.

In one example, when a station has not responded to a beacon transmission during a predetermined interval, the control signal is generated to select a new candidate radiation pattern for the beamforming antenna based on another plurality of steering weights. A new beacon transmission can be broadcast via the RF transceiver with the new candidate radiation pattern. Feedback signals from the RF transceiver can be evaluated to determine when a remote station has responded to the new beacon transmission.

In another example, when a first station has responded to a beacon transmission during a predetermined interval, the control signal is generated to select a new candidate radiation pattern for the beamforming antenna based on another plurality of steering weights. A new beacon transmission can be broadcast via the RF transceiver with the new candidate radiation pattern. It should be noted that, while the above description focuses on communication with a single remote station, associations with multiple remote stations can be accomplished in a similar fashion, with each remote station having either the same or different steering weights, depending on the responses of those stations to the beacon transmissions. Feedback signals from the RF transceiver can be evaluated to determine when one or more other remote stations have responded to any particular beacon transmission and used to assign steering weights for communication with these stations.

Step 408 can include addressing packet transmissions to the remote in accordance with an 802.11n/ac standard.

Figure 8:
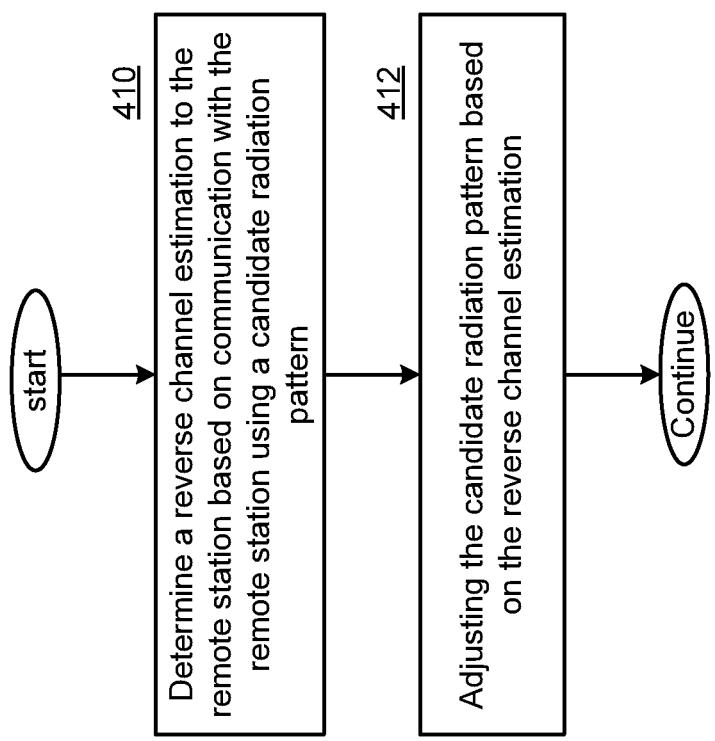
FIG. 8 is a flow diagram of an embodiment of a method in accordance with the present invention.

FIG. 8 is a flow diagram of an embodiment of a method in accordance with the present invention. In particular, a method is presented for use in conjunction with one or more functions and features described in conjunction with FIGS. 1-7. In step 410, an RF transceiver performs a reverse channel estimation to a remote station based on a received packet transmission, and then determines a set of steering weights to optimize the connection back to the remote station. In step 412, the steering weights determined from the reverse-linked are used to communicate with the remote station, and the steering weights are calculated to optimize the communication link back to the remote station.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A radio frequency (RF) transceiver having a plurality of antennas, the RF transceiver comprising:
   a configuration controller operable to generate a control signal to select a non-beamformed beacon transmission with a non-beamformed radiation pattern and to select a first candidate radiation pattern for the plurality of antennas that is beamformed based on a first plurality of steering weights; and
   an RF transceiver section, coupled to the configuration controller, operable to broadcast a non-beamformed beacon transmission with the non-beamformed radiation pattern and further a first beamformed beacon transmission with the first candidate radiation pattern, to generate feedback signals to indicate if a first remote station has responded to the non-beamformed beacon transmission and the first beamformed beacon transmission;
   wherein, when the first remote station has responded to the first beamformed beacon transmission and not the non-beamformed beacon transmission, the configuration controller is further operable to store the first plurality of steering weights used in association with the first beamformed beacon transmission and to generate the control signals to the RF transceiver section to use the first candidate radiation pattern when communicating with the first remote station via non-beacon transmissions that include data packets that are addressed to the first remote station; and wherein the configuration controller generates the control signal to alternate between the non-beamformed beacon transmission and a selected one of a plurality of different narrow beam radiation patterns including the first candidate radiation pattern.

2. The RF transceiver of claim 1 wherein, when the first remote station has not responded to the first beamformed beacon transmission, the configuration controller is further operable to generate the control signal to select a second candidate radiation pattern for the beamforming antenna based on a second plurality of steering weights; and wherein the RF transceiver section is further operable to broadcast a second beamformed beacon transmission with the second candidate radiation pattern, and to generate the feedback signals from the RF transceiver to indicate if the first remote station has responded to the second beamformed beacon transmission.

3. The RF transceiver of claim 1 wherein the configuration controller is further operable to generate the control signal to select a second candidate radiation pattern for the plurality of antennas based on a second plurality of steering weights; and the RF transceiver section is further operable to broadcast a second beamformed beacon transmission via the RF transceiver with the second candidate radiation pattern, and to generate the feedback signals to indicate when a second remote station has responded to the second beamformed beacon transmission and not the non-beamformed beacon transmission.

4. The RF transceiver of claim 3 wherein, when the first remote station has responded to the first beamformed beacon transmission, the configuration controller is further operable to determine a reverse channel estimation to the first remote station based on the communication with the second remote station using the first candidate radiation pattern, and to adjust the first plurality of steering weights and the first candidate radiation pattern based on the reverse channel estimation.

5. The RF transceiver of claim 4 wherein the RF transceiver performs a one-sided channel calibration based on a transmit path and receive path of the RF transceiver as an estimate of characteristics of the first remote station.

6. The RF transceiver of claim 1 wherein the configuration controller generates the control signals to select a plurality of candidate radiation patterns and the RF transceiver section periodically broadcast beamformed beacon transmissions via the plurality of candidate radiation patterns.

7. The RF transceiver of claim 6 wherein the non-beamformed beacon transmission has an omnidirectional radiation pattern.

8. The RF transceiver of claim 1 wherein the first remote station is a non-beamforming capable station that is out of range of the non-beamformed beacon transmission.

9. The RF transceiver of claim 1 wherein the RF transceiver section operates in accordance with an 802.11ac standard.

10. A method for use in conjunction with a radio frequency (RF) transceiver having a plurality of antenna, the method comprising:

generating a control signal to select a non-beamformed beacon transmission with a non-beamformed radiation pattern and to select a first candidate radiation pattern for the plurality of antennas that is beamformed based on a first plurality of steering weights, wherein the control signal is further generated to alternate between the non-beamformed beacon transmission and a selected one of a plurality of different narrow beam radiation patterns including the first candidate radiation pattern;

broadcasting a non-beamformed beacon transmission with a non-beamformed radiation pattern and further a first beamformed beacon transmission with the first candidate radiation pattern;

evaluating feedback signals to indicate if a first remote station has responded to the non-beamformed beacon transmission and the first beamformed beacon transmission;

when the first remote station has responded to the first beamformed beacon transmission and not the non-beamformed beacon transmission:

storing the first plurality of steering weights in association with the first beamformed beacon transmission; and communicating with the first remote station using the first candidate radiation pattern via non-beacon transmissions that are addressed to the first remote station.

11. The method of claim 10 further comprising:

when the first remote station has not responded to the first beamformed beacon transmission:

generating the control signal to select a second candidate radiation pattern for the plurality of antennas based on a second plurality of steering weights;

broadcasting a second beamformed beacon transmission via the RF transceiver with the second candidate radiation pattern; and evaluating feedback signals from the RF transceiver to determine whether the first remote station has responded to the second beamformed beacon transmission.

12. The method of claim 10 further comprising:

generating the control signal to select a second candidate radiation pattern for the plurality of antennas based on a second plurality of steering weights;

broadcasting a second beamformed beacon transmission via the RF transceiver with the second candidate radiation pattern; and evaluating feedback signals from the RF transceiver to determine whether a second remote station has responded to the second beamformed beacon transmission and not the non-beamformed beacon transmission.

13. The method of claim 10 further comprising:

when the first remote station has responded to the first beamformed beacon transmission:

determining a reverse channel estimation to the first remote station based on the communication with the second remote station using the first candidate radiation pattern; and adjusting the first plurality of steering weights and the first candidate radiation pattern based on the reverse channel estimation.

14. The method of claim 13 further comprising:

performing a one-sided channel calibration based on a transmit path and receive path of the RF transceiver as an estimate of characteristics of the first remote station.

15. The method of claim 10 wherein generating the control signals to select a first candidate first candidate radiation pattern and broadcasting the first beamformed beacon transmission are part of process to periodically broadcast beamformed beacon transmissions via a plurality of candidate radiation patterns.

16. The method of claim 15 wherein the non-beamformed beacon has transmission an omnidirectional radiation pattern.

17. The method of claim 10 wherein the first remote station is a non-beamforming capable station that is out of range of the non-beamformed beacon transmission.

18. The method of claim 10 wherein the plurality of candidate radiation patterns between the non-beamformed beacon transmission and a selected one of a plurality of different narrow beam radiation patterns including the first candidate radiation pattern.

19. The method of claim 10 wherein communicating with the first remote station using the first candidate radiation pattern includes addressing packet transmissions to the first remote station.

\* \* \* \* \*